(12) United States Patent
Bahadur et al.

(10) Patent No.: US 9,577,925 B1
(45) Date of Patent: Feb. 21, 2017

(54) AUTOMATED PATH RE-OPTIMIZATION

(71) Applicant: Juniper Networks, Inc., Sunnyvale, CA (US)

(72) Inventors: Nitin Bahadur, Santa Clara, CA (US); Sudhir Cheruathur, San Jose, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 137 days.

(21) Appl. No.: 13/940,128

(22) Filed: Jul. 11, 2013

(51) Int. Cl.
*H04L 12/28* (2006.01)
*H04L 12/723* (2013.01)

(52) U.S. Cl.
CPC .................... *H04L 45/50* (2013.01)

(58) Field of Classification Search
CPC ............ H04L 12/2668; H04L 12/2671; H04L 12/2673; H04L 12/2676; H04L 43/0876; H04L 43/0882; H04L 43/0888; H04L 43/0894
See application file for complete search history.

(56) References Cited

U.S. PATENT DOCUMENTS

| | | | |
|---|---|---|---|
| 5,878,029 A | 3/1999 | Hasegawa et al. | |
| 6,363,319 B1 | 3/2002 | Hsu | |
| 6,538,416 B1 | 3/2003 | Hahne et al. | |
| 6,765,921 B1 | 7/2004 | Stacey et al. | |
| 6,831,895 B1 | 12/2004 | Ji et al. | |
| 6,956,821 B2 | 10/2005 | Szviatovszki et al. | |
| 7,006,499 B2 | 2/2006 | Tingle et al. | |
| 7,031,312 B1 | 4/2006 | Jayakumar et al. | |
| 7,039,706 B1 | 5/2006 | Parker et al. | |
| 7,046,669 B1 | 5/2006 | Mauger et al. | |
| 7,065,084 B2 | 6/2006 | Seo | |
| 7,082,102 B1 | 7/2006 | Wright | |
| 7,164,679 B2 | 1/2007 | Kotha et al. | |
| 7,184,434 B2 | 2/2007 | Ganti et al. | |
| 7,283,563 B1* | 10/2007 | Allan .................. | H04L 12/2602 370/469 |

(Continued)

OTHER PUBLICATIONS

Vasseur, J.P. and Le Roux, J.L., Path Computation Element (PCE) Communication Protocol (PCEP), Request for Comment 5440, pp. 1-87. Mar. 2009.*

(Continued)

*Primary Examiner* — Benjamin Lamont
(74) *Attorney, Agent, or Firm* — Shumaker & Sieffert, P.A.

(57) ABSTRACT

In general, techniques are described for providing current bandwidth usage information for one or more label switched paths (LSPs) to a path computation element (PCE) to trigger the PCE to dynamically modify a path computation domain of the PCE to manage network traffic within the domain. In some examples, a network router signals an LSP in a packet-switched network according to an allocated bandwidth for the LSP. The network router receives and maps the network packets to the LSP for transport along the LSP in accordance with forwarding information. The network router determines bandwidth usage information for the LSP that indicates a volume of the network packets mapped to the LSP and sends, in a notification message, the bandwidth usage information for the LSP to a path computation element that computes label switched paths for a path computation domain to trigger reoptimization of the path computation domain.

18 Claims, 5 Drawing Sheets

(56) References Cited

U.S. PATENT DOCUMENTS

| | | | |
|---|---|---|---|
| 7,317,731 B2 | 1/2008 | Seddigh et al. | |
| 7,324,453 B2 | 1/2008 | Wu et al. | |
| 7,336,617 B1 | 2/2008 | Liu | |
| 7,336,648 B1 | 2/2008 | Sasagawa | |
| 7,369,571 B2 | 5/2008 | Choudhury et al. | |
| 7,418,493 B1 | 8/2008 | Charny et al. | |
| 7,489,695 B1 | 2/2009 | Ayyangar | |
| 7,539,210 B2 | 5/2009 | Iovanna et al. | |
| 7,558,199 B1 | 7/2009 | Minei et al. | |
| 7,567,512 B1 | 7/2009 | Minei et al. | |
| 7,606,235 B1 | 10/2009 | Ayyangar et al. | |
| 7,889,652 B1 | 2/2011 | Minei et al. | |
| 7,889,711 B1* | 2/2011 | Minei | H04L 45/30 370/351 |
| 8,094,555 B2 | 1/2012 | Ward et al. | |
| 8,339,959 B1 | 12/2012 | Moisand et al. | |
| 8,964,546 B1* | 2/2015 | Jain et al. | 370/232 |
| 2003/0028670 A1 | 2/2003 | Lee et al. | |
| 2003/0028818 A1 | 2/2003 | Fujita | |
| 2003/0103510 A1 | 6/2003 | Svanberg et al. | |
| 2003/0108051 A1 | 6/2003 | Bryden et al. | |
| 2003/0117950 A1 | 6/2003 | Huang | |
| 2003/0137971 A1 | 7/2003 | Gibson et al. | |
| 2003/0185217 A1 | 10/2003 | Ganti et al. | |
| 2003/0210705 A1 | 11/2003 | Seddigh et al. | |
| 2004/0004955 A1 | 1/2004 | Lewis | |
| 2004/0010617 A1 | 1/2004 | Akahane et al. | |
| 2004/0042398 A1 | 3/2004 | Peleg et al. | |
| 2005/0010685 A1 | 1/2005 | Ramnath et al. | |
| 2005/0013242 A1 | 1/2005 | Chen et al. | |
| 2005/0125490 A1 | 6/2005 | Ramia | |
| 2005/0128951 A1* | 6/2005 | Chawla et al. | 370/235 |
| 2005/0169270 A1 | 8/2005 | Mutou et al. | |
| 2005/0169313 A1 | 8/2005 | Okamura et al. | |
| 2005/0243833 A1 | 11/2005 | Choudhury et al. | |
| 2005/0265258 A1 | 12/2005 | Kodialam et al. | |
| 2006/0013232 A1 | 1/2006 | Xu et al. | |
| 2006/0018326 A1 | 1/2006 | Yucel | |
| 2006/0039364 A1 | 2/2006 | Wright | |
| 2006/0039391 A1 | 2/2006 | Vasseur et al. | |
| 2006/0126536 A1 | 6/2006 | Patel et al. | |
| 2006/0159009 A1 | 7/2006 | Kim et al. | |
| 2006/0182119 A1 | 8/2006 | Li et al. | |
| 2006/0209785 A1 | 9/2006 | Iovanna et al. | |
| 2006/0233137 A1 | 10/2006 | Dantu et al. | |
| 2006/0291391 A1* | 12/2006 | Vasseur et al. | 370/235 |
| 2007/0133406 A1 | 6/2007 | Vasseur | |
| 2007/0177505 A1 | 8/2007 | Charrua et al. | |
| 2007/0268821 A1 | 11/2007 | Levit et al. | |
| 2007/0268909 A1 | 11/2007 | Chen et al. | |
| 2008/0019266 A1 | 1/2008 | Liu et al. | |
| 2008/0037562 A1 | 2/2008 | Saleh et al. | |
| 2008/0049776 A1 | 2/2008 | Wiley et al. | |
| 2008/0101239 A1 | 5/2008 | Goode | |
| 2008/0123532 A1* | 5/2008 | Ward et al. | 370/238 |
| 2008/0144632 A1 | 6/2008 | Rabie et al. | |
| 2008/0168510 A1 | 7/2008 | Small et al. | |
| 2008/0175269 A1 | 7/2008 | Alvarez et al. | |
| 2008/0239959 A1 | 10/2008 | Shepherd et al. | |
| 2008/0259936 A1 | 10/2008 | Hussain et al. | |
| 2009/0003200 A1 | 1/2009 | So | |
| 2009/0122718 A1 | 5/2009 | Klessig et al. | |
| 2009/0268605 A1 | 10/2009 | Campbell et al. | |
| 2009/0285208 A1* | 11/2009 | Lu | 370/389 |
| 2010/0142370 A1* | 6/2010 | Pan | H04L 43/0811 370/228 |
| 2011/0026398 A1* | 2/2011 | Natarajan et al. | 370/230 |
| 2011/0044352 A1 | 2/2011 | Chaitou et al. | |
| 2011/0047262 A1 | 2/2011 | Martin et al. | |
| 2011/0078230 A1 | 3/2011 | Sepulveda | |
| 2011/0110368 A1 | 5/2011 | Matsumoto | |
| 2011/0134769 A1 | 6/2011 | Lee et al. | |
| 2011/0188374 A1* | 8/2011 | Zhou et al. | 370/231 |
| 2011/0202651 A1 | 8/2011 | Hilt et al. | |
| 2012/0144066 A1 | 6/2012 | Medved et al. | |
| 2012/0158938 A1 | 6/2012 | Shimonishi et al. | |
| 2013/0336126 A1* | 12/2013 | Vasseur et al. | 370/236 |
| 2014/0195689 A1* | 7/2014 | Gill et al. | 709/226 |
| 2014/0328587 A1* | 11/2014 | Magri | H04Q 11/0066 398/26 |

OTHER PUBLICATIONS

Awduche et al., "RFC 3209—RSVP-TE: Extensions to RSVP for LSP Tunnels," Network Working Group, Dec. 2001, 47 pp.

"RSVP-TE: Resource Reservation Protocol—Traffic Extension," Javvin Company, Feb. 14, 2005, 2 pp.

Jain, "Quality of Service and Traffic Engineering Using Multiprotocol Label Switching," PowerPoint presentation, Ohio State University, Aug. 1999, 90 pp.

Kim et al., "QoS-Guaranteed DiffServ-Aware-MPLS Traffic Engineering with Controlled Bandwidth Borrowing, Lecture Notes in Computer Science," 2004, 13 pp.

Davie et al., "RFC 3035; MPLS Using LDP and ATM VC Switching," Jan. 2001, 18 pp.

"A Solution for Managing Quality of Service in Internet Protocol Networks," M. Vapa—Master's Thesis, University of Jyvaskyla, Dec. 14, 2000, 91 pp.

Burhard, "Advance Reservations of Bandwidth in Computer Networks," 2004—Citeseer, 177 pp.

Raghavan, "An MPLS-Based Quality of Service Architecture for Heterogeneous Networks," S.—Nov. 12, 2001, 107 pp.

Abdelhalim, "IP/MPLS based VPNs, Layer-3 vs Layer-2," Foundry Networks, 2002, 16 pp.

Singh et al., "QoS and Traffic Engineering; MPLS, DiffSery and Constraint Based Routing," May 2000, 107 pp.

Ayyangar et al., "Inter-region MPLS Traffic Engineering", Jun. 2003, Network Working Group Internet Draft, draft-ayyangar-inter-region-te-00.txt, 21 pp.

Ayyangar et al., "Label Switched Patch Stitching with Generalized Multiprotocol Label Switching Traffic Engineering (GMPLS TE)," RFC 5150, Feb. 2008, 18 pp.

Katz et al., "Traffic Engineering (TE) Extensions to OSPF Version 2," RFC 3630, Sep. 2003, 15 pp.

Kompella et al., "Link Building in MPLS Traffic Engineering (TE)," RFC 4201, Oct. 2005, 12 pp.

Kompella et al., "Label Switched Paths (LSP) Hierarchy with Generalized Multi-Protocol Label Switching (GMPLS) Traffic Engineering (TE)," RFC 4206, Oct. 2005, 15 pp.

Lang, "Link Management Protocol (LMP)," RFC 4204, Oct. 2005, 81 pp.

Minei et al., "Extensions for Differentiated Services-aware Traffic Engineered LSPs," draft-minei-diffserv-te-multi-class-02.txt, Jun. 2006, 11 pp.

Polk et al., "A Resource Reservation Protocol (RSVP) Extension for the Reduction of Bandwidth of a Reservation Flow," RFC 4495, May 2006, 22 pp.

Rosen et al., "Multiprotocol Label Switching Architecture," RFC 3031, Jan. 2001, 57 pp.

Shiomoto et al., "Procedures for Dynamically Signaled Hierarchical Label Switched Paths," draft-ietf-ccamp-lsp-hierarchy-bis-08.txt, Feb. 27, 2010, 30 pp.

Zamfir et al., "Component Link Recording and Resource Control for TE Link Bundles," draft-ietf-mpls-explicit-resource-control-bundle-07.txt, May 25, 2010, 13 pp.

Zimmermann, "OSI Reference Model—The ISO Model of Architecture for Open Systems Interconnection," IEEE Transactions on Communications, vol. 28, No. 4, Apr. 1980, pp. 425-432.

Crabbe et al., "PCEP Extensions for Stateful PCE," Network Working Group Internet Draft, draft-crabbe-pce-stateful-pce-00, Oct. 16, 2011, 40 pp.

Farrel et al., "A Path Computation Element (PCE)-Based Architecture," RFC 4655, Aug. 2006, 41 pp.

Ash et al., "Path Computation Element (PCE) Communication Protocol Generic Requirements," RFC 4657, Sep. 2006, 22 pp.

Vasseur et al., "Path Computation Element (PCE) Communication Protocol (PCEP)," RFC 5440, Mar. 2009, 88 pp.

(56) References Cited

OTHER PUBLICATIONS

Lee et al., "Path Computation Element Communication Protocol (PCEP) Requirements and Protocol Extensions in Support of Global Concurrent Optimization," RFC 5557, Jul. 2009, 27 pp.

Sahni et al., "Bandwidth Scheduling and Path Computation Algorithms for Connection-Oriented Networks," Sixth International Conference on Networking, Apr. 22-28, 2007, 16 pp.

"OpenFlow Switch Specification," Version 1.1.0, Openflow Consortium, Feb. 28, 2011, found at http://www.openflow.org/documents/openflow-spec-v1.1.0.pdf, 56 pp.

McKeown et al., "OpenFlow: Enabling Innovation in Campus Networks," Whitepaper from Stanford University, Mar. 14, 2008, 6 pp.

Seedorf et al., "Application-Layer Traffic Optimization (ALTO) Problem Statement," RFC 5693, Oct. 2009, 15 pp.

Alimi et al., "Alto Protocol," draft-ietf-alto-protocol-06.txt, ALTO WG Internet-Draft, Oct. 25, 2010, 66 pp.

Bryant et al., "Pseudo Wire Emulation Edge-to-Edge (PWE3) Architecture," RFC 3985, Mar. 2005, 40 pp.

Miyazawa et al., "Traffic Engineering Database Management Information Base in.support of MPLS-TE/GMPLS," Internet Draft, draft-ietf-ccamp-gmpls-ted-mib-09.txt, Jul. 11, 2011, 33 pp.

Oki et al., "Framework for PCE-Based Inter-Layer MPLS and GMPLS Traffic Engineering," RFC 5623, Sep. 2009, 35 pp.

Bryskin et al., Policy-Enabled Path Computation Framework, RFC 5394, Dec. 2008, 37 pp.

Chamania et al., "Lessons Learned From Implementing a Path Computation Element (PCE) Emulator," Optical Fiber Communication and Exposition, Mar. 6-10, 2011, 3 pp.

U.S. Appl. No. 13/324,861, filed Dec. 13, 2011, and entitled "Path Computation Element Communication Protocol (PCEP) Extensions for Stateful Label Switched Path Management".

U.S. Appl. No. 13/112,961, filed May 20, 2011, and entitled "Weighted Equal-Cost Multipath".

U.S. Appl. No. 13/110,987, filed May 19, 2011 and entitled "Dynamically Generating Application-Layer Traffic Optimization Protocol Maps".

U.S. Appl. No. 12/182,619, filed Jul. 30, 2008, and entitled "Streamlined Packet Forwarding Using Dynamic Filters for Routing and Security in a Shared Forwarding Plane."

"Configuring Automatic Bandwidth Allocation for LSPs," JUNOS 9.5 MPLS Applications Configuration Guide, Accessed May 7, 2013, 7 pp.

* cited by examiner

AUTOMATED PATH RE-OPTIMIZATION

TECHNICAL FIELD

The disclosure relates to computer networks and, more particularly, to engineering traffic flows within computer networks.

BACKGROUND

The term "link" is often used to refer to the connection between two devices on a computer network. The link may be a physical medium, such as a copper wire, a coaxial cable, any of a host of different fiber optic lines or a wireless connection. In addition, network devices may define "virtual" or "logical" links, and map the virtual links to the physical links. As networks grow in size and complexity, the traffic on any given link may approach a maximum bandwidth capacity for the link, thereby leading to congestion and loss.

Multi-protocol Label Switching (MPLS) is a mechanism used to engineer traffic patterns within Internet Protocol (IP) networks. Traffic engineering may be applied within a network for a variety of purposes, such as to route traffic around network failures or congested links or to direct certain traffic along a particular path through the network that meets a set of explicit quality of service (QoS) requirements. For example, a router within the network may establish a label switched path (LSP) in a MPLS/IP network using a resource reservation protocol, such as the Resource Reservation Protocol with Traffic Engineering extensions (RSVP-TE). Once a packet is mapped on to an LSP by a head-end label edge router (LER) for the LSP and forwarded by the LER, the intermediate devices along the LSP forward the packet based on labels attached to the packet, rather than making independent forwarding decisions based on the packet destination and the intermediate devices' routing information. A Traffic Engineering LSP (TE LSP) may in this way be used to define and implement a path from a source device to a destination device that satisfies requirements for certain traffic transported by the network.

The explicit requirements that must be satisfied by an LSP represent constraints upon the set of possible paths from the source device to the destination device. These constraints, such as available bandwidth, cause shortest path first algorithms to compute a satisfactory path with regard to the constraint metrics. The network routers then establish an LSP that matches the computed path and, using the LSP, forward traffic in a manner that satisfies the constraints. Constrained shortest path first (CSPF) thus represents a fundamental building block for traffic engineering systems, including MPLS and Generalized MPLS (GMPLS) networks. However, constraint-based path computation in large, multi-domain, multi-region, and/or multi-layer networks is complex and may in some instances require cooperation between elements in different administrative domains that do not exchange sufficient traffic engineering information for computing multi-domain paths.

Network operators may augment the functionality of their networks by introducing one or more path computation elements (PCEs) that allow the network routers to offload path computation. A PCE establishes PCE communication protocol (PCEP) sessions with one or more path computation clients (PCCs) through a network. Path computation clients, such as routers, issue path computation requests to the PCE using their respective PCEP sessions. The PCE applies constraints provided in a path computation request to compute the path of a TE LSP through a path computation domain that satisfies the constraints. The PCE then returns the path to the requesting PCC, effectively augmenting the network path computation functionality.

SUMMARY

In general, techniques are described for providing current bandwidth usage information for one or more label switched paths (LSPs) to a path computation element (PCE) to trigger the PCE to dynamically modify a path computation domain of the PCE to manage network traffic within the domain. The PCE may, for instance, manage the traffic by resizing one or more of the LSPs or by modifying traffic patterns engineered to the LSPs.

In some examples, the PCE or network administrator may establish the LSPs as Traffic Engineering LSP (TE LSP) having an allocated (or "reserved") bandwidth within an MPLS/IP network. In one example implementation, a head-end label edge router (LER) of each TE LSP maps network traffic to the TE LSP and periodically monitors utilization of the LSP bandwidth. If the LER determines that the LSP traffic bandwidth usage crosses an overflow or underflow threshold value for the bandwidth allocated to the LSP, the LER notifies the PCE of the overflow or underflow. The PCE may then take ameliorative action to, e.g., adjust the LSP bandwidth allocation, redistribute incoming traffic load across other LSPs/paths, modify a routing policy to divert traffic away from the LER in the case of overflow, or modify a routing policy to attract traffic to the LER in the case of underflow.

The techniques may be particularly useful in legacy network environments. Legacy networks may have limited application awareness and therefore be unable to be notified or to pre-judge application bandwidth needs in advance of LSP setup, which prevents legacy network PCEs from accurately determining allocated bandwidth for LSPs. The techniques described in this disclosure may permit the PCE to dynamically adjust LSPs according to near real-time LSP bandwidth usage and thereby improve the coordination of traffic demand placement and, as a result, network performance. Furthermore, because in some instances the techniques include decentralized determination of LSP bandwidth usage overflow or underflow by the head-end LERs for the LSPs, the PCE in cooperation with the LERs may perform path and/or traffic placement re-optimization without requiring periodic real-time updates of LSP bandwidth usage to the PCE, which may reduce the signaling load on the network devices. Moreover, because the PCE has a global view (or at least a more comprehensive view vis-à-vis head-end LERs for LSPs) of a network in which the LERs participate in forwarding traffic, the PCE may make a more optimal determination of the particular ameliorative steps to undertake to manage dynamic changes in the bandwidth usage of the LSPs than may be made by any LER alone.

In one aspect, a method includes signaling, by a network router, a label switched path (LSP) in a packet-switched network according to an allocated bandwidth for the LSP, wherein the network router is a head-end label edge router for the LSP. The method also includes receiving, by the network router, network packets. The method further includes mapping, by the network router, the network packets to the LSP for transport along the LSP. The method also includes determining, by the network router, bandwidth usage information for the LSP that indicates a volume of the network packets mapped to the LSP by the network router. The method further includes sending, by the network router in a notification message, the bandwidth usage information for the LSP to a path computation element that computes label switched paths for a path computation domain that includes the network router to trigger reoptimization of the path computation domain by the path computation element.

In another aspect, a method includes receiving, from a network router by a path computation element that computes label switched paths for a path computation domain that includes the network router, a notification message that includes bandwidth usage information for a label switched path (LSP) in a packet-switched network and operating according to an allocated bandwidth for the LSP, wherein the bandwidth usage information indicates a volume of traffic mapped to the LSP by the network router. The method also includes, in response to receiving the notification message and by the path computation element, sending a configuration message to the path computation domain to modify the path computation domain to manage the volume of traffic mapped to the LSP by the network router.

In another aspect, a network router includes a control unit comprising a processor and a routing protocol module executed by the control unit and configured to signal a label switched path (LSP) in a packet-switched network according to an allocated bandwidth for the LSP, wherein the network router is a head-end label edge router for the LSP. The network router also includes one or more network interfaces configured to receive network packets, and one or more forwarding components configured to map the network packets to the LSP for transport along the LSP in accordance with forwarding information, wherein the forwarding components are further configured to determine bandwidth usage information for the LSP that indicates a volume of the network packets mapped to the LSP by the network router. The network router further includes a path computation element interface configured to send, in a notification message, the bandwidth usage information for the LSP to a path computation element that computes label switched paths for a path computation domain that includes the network router to trigger reoptimization of the path computation domain by the path computation element.

In another aspect, a path computation element that computes label switched path for a path computation domain includes a control unit comprising a processor. The path computation element also includes a path computation client interface executed by the control unit and configured to receive, from a network router of the path computation domain, a notification message that includes bandwidth usage information for a label switched path (LSP) in a packet-switched network and operating according to an allocated bandwidth for the LSP, wherein the bandwidth usage information indicates a volume of traffic mapped to the LSP by the network router. The path computation element further includes a network optimization engine configured to determine, in response to the notification message, a modification to the path computation domain, wherein the path computation client interface is configured to sending a configuration message to the path computation domain to modify the path computation domain to manage the volume of traffic mapped to the LSP by the network router in accordance with the modification.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
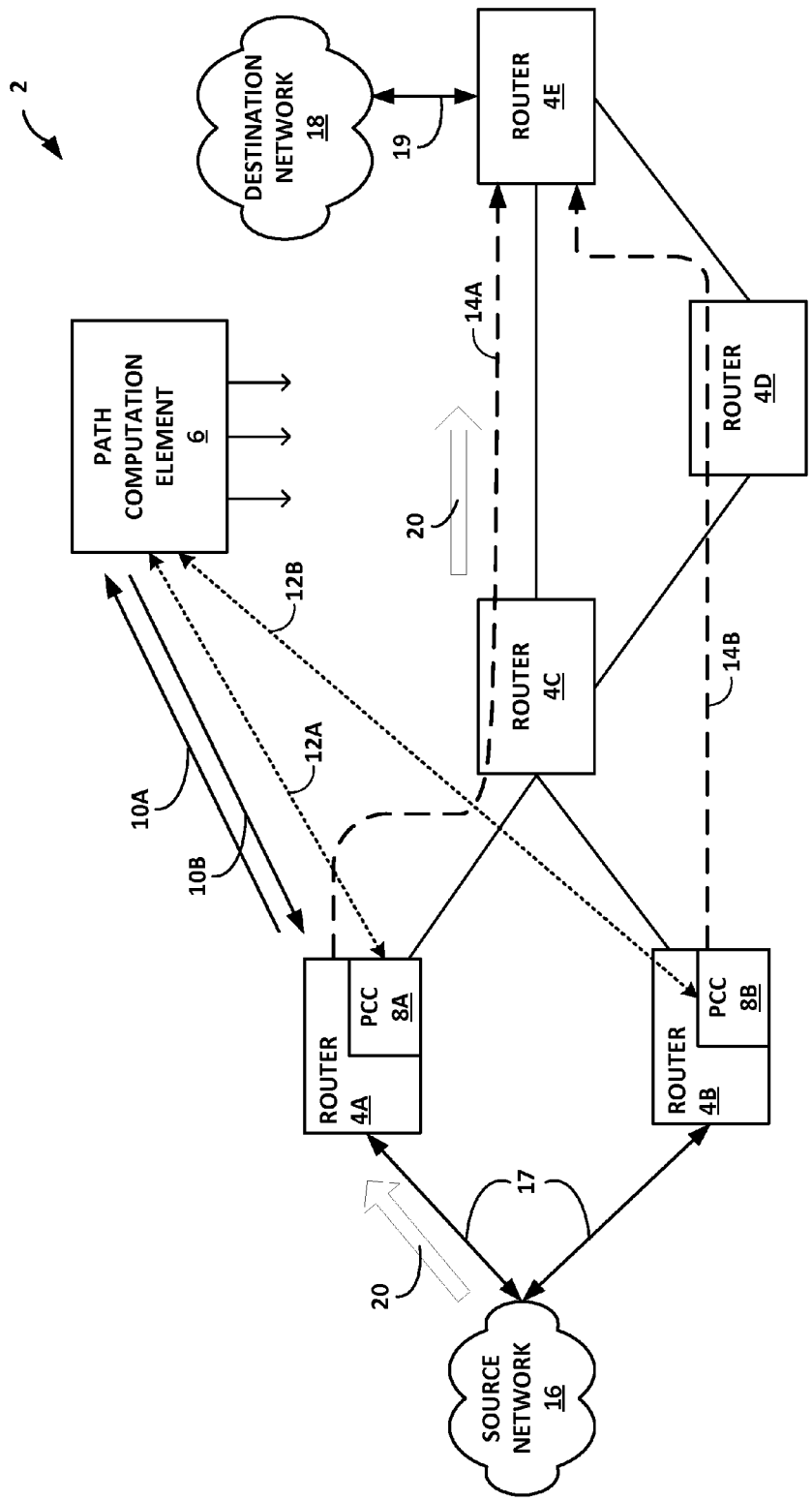
FIG. 1 is a block diagram illustrating a network system in which a path computation element (PCE) uses current label switched path (LSP) bandwidth usage information obtained from routers to resize LSPs or modify traffic patterns previously engineered to the LSPs in accordance with techniques of this disclosure.

FIG. 1 is a block diagram illustrating a network system in which a path computation element (PCE) uses current label switched path (LSP) bandwidth usage information obtained from routers to resize LSPs or modify traffic patterns previously engineered to the LSPs in accordance with techniques of this disclosure. In this example, network system 2 includes PCE 6 and a plurality of routers 4A-4E ("routers 4") interconnected in the illustrated topology by network links. Routers 4 are members of a path computation domain served by PCE 6. The path computation domain may include, for example, an Interior Gateway Protocol (e.g., Open Shortest Path First (OSPF) or Intermediate System-to-Intermediate System (IS-IS)) area, an Autonomous System (AS), multiple ASes within a service provider network, multiple ASes that span multiple service provider networks. In various examples, different combinations of routers 4 may include member routers of multiple ASes. As such, network links connecting routers 4 may be interior links, inter-AS transport links, or some combination thereof. While illustrated and described primarily with respect to routers that execute one or more routing protocols, the techniques may be applicable to any network device that implements Multi-Protocol Label Switching (MPLS) or Generalized MPLS (GMPLS), including Layer 3, XMPP, and/or OpenFlow switches. As these other types of network devices forward labeled network packets in accordance with MPLS/GMPLS protocols, the network devices may also be referred to as LERs or Label Switching Routers (LSRs).

PCE 6 uses traffic engineering and LSP state information learned from routers 4 to apply constraints to compute network paths for MPLS traffic engineering LSPs (TE LSPs) both in response to requests from any of routers 4 and autonomously. PCE 6 represents an application or other process executing on, for instance, a network node such as one of routers 4, a component of a network node, or an in-network or out-of-network server. To obtain traffic engineering information for storage in a traffic engineering database (not shown in FIG. 1), PCE 6 may execute one or more network routing protocols, extended to carry traffic engineering information, to listen for routing protocol advertisements that carry such traffic engineering information. PCE 6 computes paths for TE LSPs by applying bandwidth and other constraints to learned traffic engineering information. A resulting path may be confined to a single domain or may cross several domains.

Routers 4A-4B include respective path computation clients 8A-8B ("PCCs 8") that communicate with PCE 6 using respective extended PCE communication protocol (PCEP) sessions 12A-12B. Reference herein to a PCC may additionally refer to a router or other network device that includes the PCC. In one example, each of PCCs 8 is an application or other process or process component executed by the router that establishes an extended PCEP session 12 with which to, e.g., request path computation from PCE 6 or provide bandwidth usage information to PCE 6. An extended PCEP session 12 may operate over Transport Control Protocol (TCP) using a well-known port. In addition, although described with respect to extended PCEP sessions 12 that substantially conform to one or more implementations of PCEP, routers 4A-4B and PCE 6 may exchange bandwidth usage information and configuration information using other suitable protocols extended to support the described techniques, such as OpenFlow or XMPP, another software-defined networking (SDN)-enabling protocol, or a routing protocol such as Open Shortest Path First (OSPF) or Border Gateway Protocol (BGP).

Routers 4C-4E do not, in this example, represent a head-end label edge router (LER) that establishes TE LSPs 14A-14B and therefore do not include a path computation client. Instead, routers 4C-4D are illustrated as LSRs, while router 4E is illustrated as a tail-end LER of TE LSPs 14A-14B. In other examples, any of routers 4C-4E may also include a PCC 8 to exchange path computation information with PCE 6. In other words, not all of routers 4 need support the described techniques, and each router 4 may advertise to PCE 6 whether it supports the extended functionality described herein.

PCEP provides a mechanism for PCCs 8 to issue to PCE 6 a path computation request for one or more TE LSPs. In other words, a PCE executing conventional PCEP operates in a request/reply mode, where PCCs requests a computation and the PCE replies with a result. For each requested TE LSP, the path computation request may include a required bandwidth, a setup/holding priority, the source and destination network addresses, and a request priority. PCE 6 replies with a computed path for a requested TE LSP when the PCE 6 determines a path using the learned traffic information that satisfies the constraints. Upon receiving a response from PCE 6, routers 4 use a resource reservation protocol, such as Resource Reservation Protocol with Traffic Engineering extensions (RSVP-TE), to reserve resources along a computed path and establish TE LSPs to carry traffic mapped to the LSPs. Additional details regarding conventional PCEP may be found in "Path Computation Element (PCE) Communication Protocol (PCEP)," Network Working Group, Request for Comment 5440, March 2009, the entire contents of which being incorporated by reference herein (hereinafter "RFC 5440"). Additional information on RSVP-TE may be found in "RSVP-TE: Extensions to RSVP for LSP Tunnels", Network Working Group, Request for Comment 3209, December 2001, which is incorporated herein by reference in its entirety.

In the illustrated example network system 2, PCC 8A receives from PCE 6 a computed path that causes router 4A to use RSVP-TE to head (or "operate as an ingress for") and establish TE LSP 14A that traverses LSR 4C to tail-end (or "egress") label edge router (LER) 4E according to an allocated bandwidth. Similarly, PCC 8B receives from PCE 6 a computed path that causes router 4B to use RSVP-TE to head and establish TE LSP 14B that traverses LSRs 4C and 4D to tail-end LER 4E according to an allocated bandwidth. Only two TE LSPs are shown for ease of illustration. In various examples, network system 2 may include any number of TE LSPs connecting different pairs of routers 4. In addition, TE LSPs may recursively include other TE LSPs as virtual links. For example, TE LSP 14A may include, as a virtual link, a TE LSP (not shown) that tunnels labeled traffic from router 4C to router 4D (in such instances, router 4C may also include a PCC 8 to request and/or receive a computed path).

Routers 4A-4B couple by communication links 17 to source network 16 that sources network traffic to routers 4A-4B, including network traffic 20 to router 4A. Routers 4A-4B map network traffic from source network 16 to respective TE LSPs 14A-14B for transport to router 4E and subsequent delivery to destination network 18 coupled to router 4E by communication link 19.

In accordance with techniques described in this disclosure, extended PCEP sessions 12 support additional functionality (i.e., beyond that provided by conventional PCEP described in RFC 5440) to allow PCCs 8 to provide LSP bandwidth usage information to PCE 6. Router 4A, for instance, monitors bandwidth usage of LSP 14A by network traffic mapped to LSP 14A by router 4A and generates corresponding bandwidth usage information. PCC 8A may then provide the bandwidth usage information to PCE 6 using PCEP session 12A. Bandwidth usage information for any of LSPs 14 may include, e.g., bandwidth utilization measured as a percentage of the bandwidth allocated to the LSP, absolute bandwidth of network traffic mapped to the LSP, an indication that bandwidth has overflowed or underflowed configured bandwidth thresholds expressed in absolute terms or as a utilization percentage, any combination of the above examples, or another type of information indicative of current LSP bandwidth usage. Router 4A may collect traffic statistics for LSP 14A on a periodic basis according to a prescribed interval and generate bandwidth usage information at the same or a different interval, or generate bandwidth usage information as needed (e.g., only when the bandwidth has overflowed or underflowed configured thresholds). Current LSP bandwidth usage and corresponding bandwidth usage information may represent a maximum average bandwidth usage over an interval.

PCC 8A sends PCE 6 a notification message 10A that includes current bandwidth usage information generated by router 4A for LSP 14A. PCE 6 may use the current bandwidth usage information and in some cases other obtained traffic engineering information to re-optimize the LSPs 14 of the path computation domain or modify traffic patterns previously engineered to LSPs 14 in order to improve the coordination of traffic demand placement and, as a result, performance of network system 2. For example, PCE 6 may resize LSP 14A to more closely match the current traffic pattern of network traffic 20 mapped by router 4A to LSP 14A, modify the current traffic pattern to redistribute incoming network traffic 20 to another LSP headed by router 4A (not shown), modify the routing policy of network system 2 to divert at least some of network traffic 20 sourced by source network 16 to router 4B, or modify the routing policy of network system 2 to attract additional network traffic toward router 4A for transport by LSP 14A.

In the illustrated example, in response to notification message 10A, PCE 6 determines the bandwidth needs of LSP 14A, weighs the bandwidth needs in view of other traffic engineering information for the PCE 6 path computation domain, and computes new configuration information for router 4A that manages the bandwidth needs in view of the other traffic engineering information. PCE 6 sends configuration message 10B including the new configuration information to PCC 8A, in some cases by extended PCEP session 12A and in some cases by a routing protocol session. Configuration message 10B directs router 4A to operate according to the new configuration information. The new configuration information may include, for instance, new LSP parameters for 14A (e.g., a new allocated bandwidth and/or a new path), a Border Gateway Protocol (BGP) or other route that when advertised to source network 16 diverts/attracts network traffic from/to router 4A, or new forwarding equivalence class (FEC) definitions that modify the amount of network traffic 20 mapped to LSP 14A. In some cases, PCE 6 may determine that the currently allocated bandwidth for LSP 14A is commensurate in view of the other traffic engineering information and so refrain from computing and sending new configuration information to PCC 8A. In this way, routers 4A-4B operate to indicate, to PCE 6, changes in measured traffic patterns to enable PCE 6 to take ameliorative measures to re-configure routers 4 of the path computation domain to constructively manage the changes.

In some instances, routers 4A-4B may provide bandwidth usage information for and delegate control over either or both of LSPs 14 to allow PCE 6 to trigger re-route or re-sizing of the LSPs using techniques described in U.S. patent application Ser. No. 13/324,861, filed Dec. 13, 2011, and entitled "PATH COMPUTATION ELEMENT COMMUNICATION PROTOCOL (PCEP) EXTENSIONS FOR STATEFUL LABEL SWITCHED PATH MANAGEMENT," the entire contents of which being incorporated herein. For example, notification message 10A may represent an extended PCEP LSP state report message extended to include bandwidth usage information, and configuration message 10B may represent a PCEP LSP update request that includes configuration information with which to resize LSP 14A. Alternatively, notification message 10A may represent a PCEP Notification (PCNtf) message that identifies an existing TE LSP and is extended to include a NOTIFICATION object that includes a Flag or Type-Length-Value object that provides bandwidth usage information. As a still further example, notification message 10A may represent a PCEP Request message (PCReq) requesting reoptimization, as described in further detail with respect to FIG. 4. In some instances, PCE 6 may send configuration message 10B to network device other than router 4A in the path computation domain for PCE 6, such as by sending a BGP UPDATE message advertising a new route to attract/divert network traffic to/from router 4A.

Figure 2:
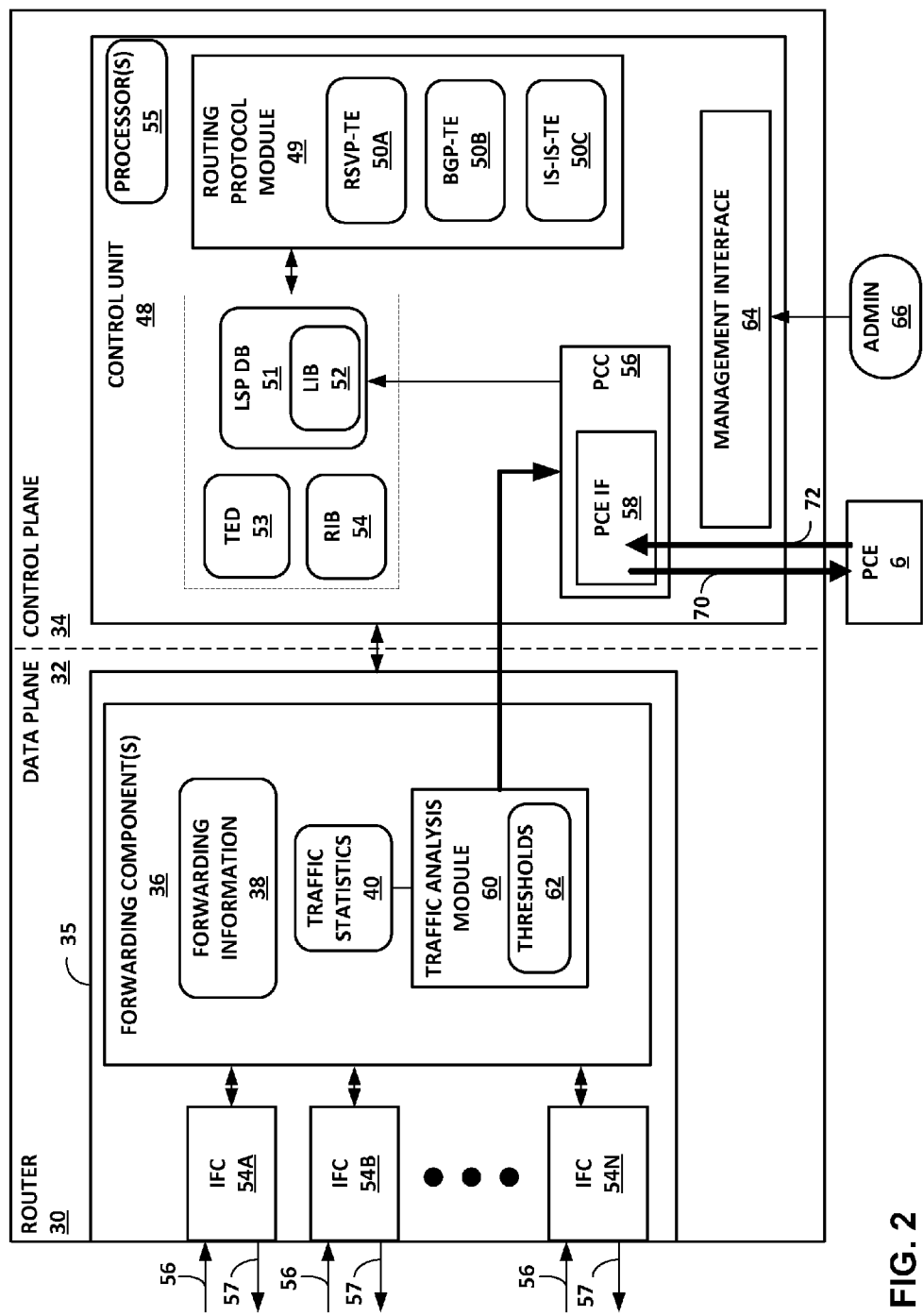
FIG. 2 is a block diagram of a router that measures bandwidth usage for a traffic engineering label switched path and provides bandwidth usage information to a path computation element according to techniques described in this disclosure.

FIG. 2 is a block diagram of a router that measures bandwidth usage for a traffic engineering label switched path and provides bandwidth usage information to a path computation element according to techniques described in this disclosure. For purposes of illustration, router 30 may be described below within the context of an exemplary network system 2 of FIG. 1 and may represent any one of routers 4. Moreover, while described with respect to a particular network device, e.g., a router, the techniques may be implemented by any network device that executes MPLS/GMPLS to establish and operate LSPs. The techniques should therefore not be limited to the exemplary embodiments described in this disclosure.

Router 30 includes a control (or "routing") unit 48 that implements a control plane 34 (alternatively, "routing plane 34"). Data plane (alternatively, "forwarding plane") 32 represents hardware or a combination of hardware and software that forward network traffic in accordance with forwarding information 38 that includes network destinations of output links 57 as well as MPLS forwarding information such as LSP label mappings that associate outbound labels and interfaces to inbound labels received on incoming traffic. In the example of router 30, data plane 32 includes one or more forwarding units 35 that each use one or more forwarding components 36 to provide high-speed forwarding of network traffic received by interface cards 54A-54N ("IFCs 54") via inbound links 56 to outbound links 57. Forwarding components 36 may each comprise one or more packet forwarding engine ("PFE") or forwarding Application Specific Integrated Circuits (ASICs) coupled to respective interface cards 44. Each of forwarding units 35 may represent, for example, a dense port concentrator (DPC), modular port concentrator (MPC), flexible physical interface card (PIC) concentrator (FPC), or another line card, for example, that is insertable within a router 30 chassis or combination of chassis.

Control unit 48 and forwarding units 35 may include one or more processors that execute software instructions, such as those used to define a software or computer program, stored to a computer-readable storage medium (not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. As illustrated, control unit 48 includes one or more processors 55. Alternatively or additionally, control unit 48 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. Control unit 48 and forwarding units 35 may communicate by a dedicated communication link, such as an Ethernet communication link. Further details of one example embodiment of a router can be found in U.S. patent application Ser. No. 12/182,619, filed Jul. 30, 2008, and entitled "STREAMLINED PACKET FORWARDING USING DYNAMIC FILTERS FOR ROUTING AND SECURITY IN A SHARED FORWARDING PLANE," which is incorporated herein by reference.

Control unit 48 executes the routing functionality of router 30. In this respect, control unit 48 represents hardware or a combination of hardware and software that implements, by routing protocol module 49, protocols 50A-50C by which routing information stored in routing information base 54 ("RIB 54") may be determined. RIB 54 may include information defining a topology of a network, such as network 2 of FIG. 1. Routing protocol module 49 may resolve the topology defined by routing information in RIB 54 to select or determine one or more routes through the network. Routing protocol module 49 may then update data plane 32 with representations of these routes, where forwarding components 36 of data plane 32 maintains these representations as forwarding information 38.

Routing protocols 50 executed by routing protocol module include, in this example, Border Gateway Protocol with Traffic Engineering extensions (BGP-TE) 50B and Intermediate System-to-Intermediate System with Traffic Engineering extensions (IS-IS-TE) 50C. Routing protocol module 49 executes these protocols to advertise and receive routing and traffic engineering information from other routers, including autonomous system border routers of external ASes and routers within a routing domain in which router 30 participates. Various other examples may implement other link-state or vector-distance protocols to exchange traffic engineering with other routers. Routing protocol module 49 stores received traffic engineering information in traffic engineering database 53 (illustrated as "TED 53"), which is stored in a computer-readable storage medium. TED 53 may subsume RIB 54 in some instances to store all traffic engineering information in a single data structure. TED 53 may store, for example, one or more of the link state, administrative attributes, and metrics such as bandwidth available for use at various LSP priority levels of links connecting router 30 to other routers of an MPLS domain.

Control plane unit 48 executes management interface 64 by which a network management system or in some instances an administrator 66 using, e.g., a command line or graphical user interface configures label switched paths described in LSP database 51 (illustrated as "LSP DB 51"). LSP database 51 includes LSP configuration data, for example, an LSP destination, setup/hold priorities, path (e.g., an RRO), metrics, a label information base 52 ("LIB 52") and other LSP attributes such as those described herein. Label information base 52 stores label allocations that specify how routing protocol module 49 has allocated MPLS labels for LSPs of LSP DB 51. For example, LIB 52 may indicate label bindings to particular forwarding equivalence classes (FECs) associated with LSPs within a network. Control unit 48 may then update FIB 52 of forwarding component 46 with the labels to be applied when forwarding packets on LSPs.

PCC 56 executed by control unit 48 may represent an example instance of any of PCCs 8 of FIG. 1 and includes PCE interface 58 ("PCE IF 58") to establish an extended PCEP session with a PCE device according to techniques described in this disclosure. In some cases, PCC 56 may receive, from the PCE, LSP configuration data defining a new TE LSP to be headed by router 30. PCC 56 adds the new TE LSP to LSP DB 51 and triggers routing protocol module 49 to set up the new TE LSP.

RSVP-TE 50A executed by routing protocol module 49 is a signaling protocol that establishes explicitly routed LSPs over a network. RSVP-TE 50A may receive an explicit routing path from an administrator, for example, for a new LSP tunnel as well as a configured bandwidth for the LSP tunnel. RSVP-TE 50A requests downstream routers to bind labels to a specified LSP tunnel set up by router 30 and may direct downstream routers of the LSP tunnel to reserve bandwidth for the operation of the LSP tunnel. In addition, routing protocol module 49 installs MPLS forwarding state to forwarding information 38 to reserve bandwidth for one of outbound links 57 of IFCs 54 for the LSP tunnels and, once the LSP is established, to map a label for the LSP to network traffic, which is then forwarded by data plane 32 in accordance with the MPLS forwarding state for the LSP. The set of packets assigned by router 30 to the same label value for an LSP tunnel belong to a particular forwarding equivalence class (FEC) and define an RSVP flow. Various instances of router 30 may also, or alternatively, use standard RSVP (i.e., without traffic engineering extensions) or Label Distribution Protocol (LDP) to signal LSPs. In addition, routing protocol module 49 executes protocols 50 to receive traffic engineering information that affects the state of LSPs, such as failed links and preempted resources that may result in a down state for LSPs. Routing protocol module 49 may associate such LSP state information with corresponding LSPs in LSP DB 51.

Traffic analysis module 60 of data plane 32 monitors TE LSP traffic through data plane 32 and generates traffic statistics 40. Traffic analysis module 60 may, for example, monitor a bandwidth of TE LSP traffic being mapped to and output for each of the TE LSPs of LSP DB 51 and store this bandwidth to traffic statistics 40. Traffic analysis module 60 may compute traffic statistics 40 for one or more of the TE LSPs according to a configured sampling interval and according to an average computed over a configured statistics interval. Aspects of traffic analysis module 60 may be distributed to control plane 34 in various instances of router 30.

In accordance with techniques described herein, traffic analysis module 60 may periodically determine whether a bandwidth usage for a TE LSP exceeds (or "crosses") an overflow or underflow threshold of configured bandwidth thresholds 62 (illustrated as "thresholds 62") for the TE LSP. Configured thresholds 62 define utilization (e.g., 15% over/under an allocated bandwidth) or absolute (e.g., 10 Mbps) thresholds for TE LSPs headed by router 30 and may be configured by an external entity using management interface 64. In some instances, PCE 6 having a global (or at least more comprehensive vis-à-vis router 30) view of a network in which router 30 participates in forwarding traffic, may determine appropriate thresholds 62 for TE LSPs that are to trigger path (TE LSP) re-optimization by PCE 6. As such, PCE 6 may use management interface 64 or, alternatively, the extended PCEP session with PCE IF 58 to configure thresholds 62. The periodicity of the determination may be specified as a bandwidth adjustment interval to cause traffic analysis module 60 to determine threshold-crossing (e.g., threshold-exceeding) bandwidth usage at the expiry of the interval according to an instant sampling, an average over the bandwidth adjustment interval, or an average of preceding sampling intervals, among other sampling options. If traffic analysis module 60 determines that a bandwidth usage for a TE LSP crosses the associated thresholds 62, traffic analysis module 60 triggers PCC 56 to send notification message 70 to notify PCE 6 that the volume of traffic being mapped to the TE LSP has crossed the associated thresholds 62. The "volume of traffic" or "volume of packets" may refer to a bandwidth measured and/or expressed, for instance, in units of bits per second (bps), megabits per second (Mbps), Gigabits per second (Gbps), or in units of number of packets.

Notification message 70 identifies a TE LSP and includes bandwidth usage information for the TE LSP usable by PCE 6 to decide whether to resize the TE LSP to increase or decrease the TE LSP reserved bandwidth. Notification message 70 may represent an example instance of notification message 10A of FIG. 1. Example notification messages are described in detail below with respect to FIGS. 4-5.

PCE 6 may, in response to notification message 70, return a configuration message 72 to PCC 56 directing PCC 56 to resize the TE LSP identified in notification message 70 according to a specified bandwidth. Accordingly, PCC 56 triggers routing protocol module 49 to use RSVP-TE to signal a new TE LSP according to the specified bandwidth, tear down the old TE LSP, and switchover traffic previously mapped to the old TE LSP to map to the new TE LSP. In some instances, PCE 6 may send to router 30 data defining a refined FEC for the identified TE LSP in order to increase/decrease the volume of traffic mapped to the TE LSP, in which case router 30 installs the refined FEC to forwarding information 38. In still further instances, PCE 6 issues a new policy for routing protocol module 49 to attract or divert more traffic for the TE LSP identified in notification message to/from router 30. The new policy may represent, for instance, a route for advertisement by BGP-TE 50B. PCE 6 may cooperate with router 30 to perform any subset of the above-described actions in response to notification message 70. PCC 56 may store the route to RIB 54 or TED 53. In this way, router 30 autonomously monitors bandwidth usage information for a TE LSP and triggers a bandwidth allocation adjustment for the TE LSP or some other ameliorative action by PCE 6, which may enable PCE 6 to improve the coordination of traffic demand placement to router 30 and, as a result, network performance.

Figure 3:
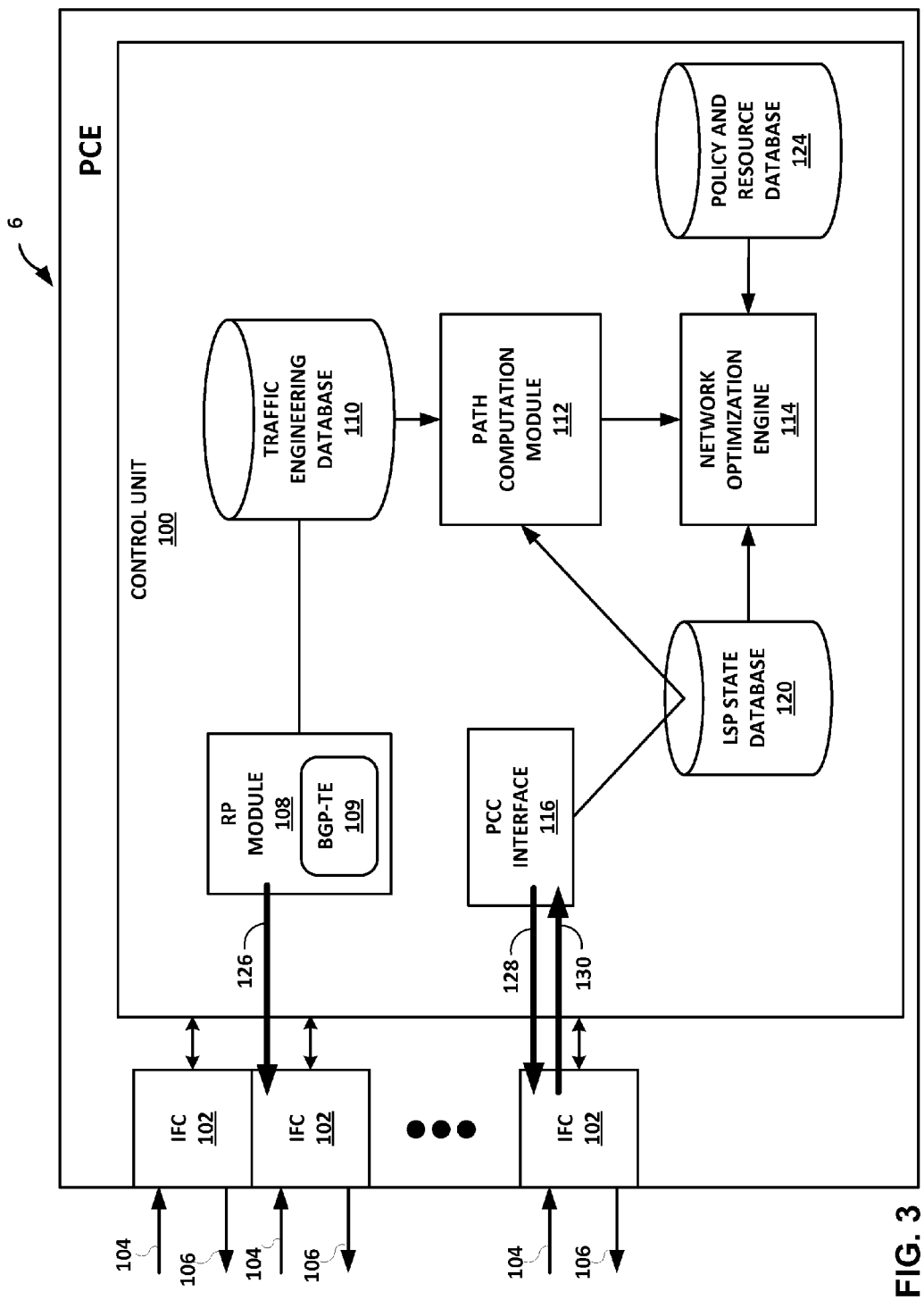
FIG. 3 is a block diagram illustrating an example path computation element configured to use current label switched path (LSP) bandwidth usage information to resize one or more LSPs or modify traffic patterns previously engineered to the LSPs.

FIG. 3 is a block diagram illustrating an example path computation element configured to use current label switched path (LSP) bandwidth usage information to resize one or more LSPs or modify traffic patterns previously engineered to the LSPs. PCE 6, in this example, includes control unit 100 coupled to interface cards 102 ("IFCs 102") for receiving packets via input links 104 ("input links 104") and sending packets via output links 106 ("output links 106"). PCE 6 may represent an example instance of PCE 6 of FIG. 1-2.

Control unit 100 may include one or more processors (not shown in FIG. 3) that execute software instructions, such as those used to define a software or computer program, stored to a computer-readable storage medium, such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 100 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Routing protocol module 108 ("RP module 108") executed by control unit 100 executes one or more routing protocols extended to advertise and receive traffic engineering (TE) information, including illustrated BGP-TE 109. RP module 108 may in some instances be a passive listener and eschew routing protocol advertisements. RP module 108 may additionally, for example, execute Intermediate System-to-Intermediate System with TE extensions (IS-IS-TE) or Open Shortest Path First with TE extensions (OSPF-TE). Additional details regarding executing BGP to receive TE info are found in U.S. patent application Ser. No. 13/110, 987, filed May 19, 2011 and entitled "DYNAMICALLY GENERATING APPLICATION-LAYER TRAFFIC OPTIMIZATION PROTOCOL MAPS," which is incorporated herein by reference in its entirety. Not all instances of PCE 6 include RP module 108.

Traffic engineering information received by RP module 108 includes topology information for the path computation domain served by PCE 6. Such traffic engineering information includes one or more of the link state, administrative attributes, and metrics such as bandwidth available for use at various LSP priority levels of links connecting routers of the domain. RP module 108 stores traffic engineering information in traffic engineering database (TED) 110, which is stored in a computer-readable storage medium for use in path computation.

Client interface 116 of control unit 100 implements PCE communication protocol (PCEP) extensions to receive and send extended PCEP messages described in this disclosure. That is, client interface 116 establishes extended PCEP sessions with one or more path computation clients (PCCs) operating on MPLS-enabled routers in the network. By the extended PCEP sessions, client interface 116 receives notification messages that include bandwidth usage information for LSPs operating with a path computation domain for PCE 6. In the illustrated example, PCC interface 116 receives, from a PCC client of a network device within a path computation domain, notification message 130 that includes bandwidth usage information for a particular LSP. Notification message may represent an example instance of notification message 10A of FIG. 1 or notification message 70 of FIG. 2. PCC interface 116 may store the bandwidth usage information to LSP state database 120 or alternatively, in some instances, to TED 110.

Network optimization engine 114 executing on control unit 100 uses traffic engineering information of TED 110 and the bandwidth usage information for an LSP received in notification message 130 to determine whether to resize the LSP or modify the criteria by which network packets shall be mapped to the LSP in accordance with a FEC filter for the LSP or routing policies. Such criteria may include packet characteristics including source/destination IP address, source/destination port, and protocol, among others. Policy and resource database 424 may store policies that determine the operation of PCE 6 to further the normative goals of the network operator, in particular of network optimization engine 114, upon the occurrence of specified conditions including the receipt of bandwidth usage information. Such goals may include maximizing total throughput and/or fostering bandwidth allocation fairness for requested resources, for instance. Network optimization engine 114 may invoke path computation module 112, which executes constrained SPF (CSPF) using supplied constraints to determine a set of paths from a source to a destination that satisfy the constraints.

In response to notification message 130 having bandwidth usage information for a LSP, network optimization engine 114 may determine to resize the LSP to increase or decrease the bandwidth allocated to the LSP on the head-end router. Accordingly, network optimization engine 114 directs PCC interface 116 to send configuration message 128 to the head-end router to direct the head-end router to resize the LSP identified in notification message 128 according to a bandwidth specified in configuration message 128. In some instances, configuration message 128 include a new FEC filter for the LSP identified in notification message 128 that increases/decreases an amount of traffic mapped by the head-end route to the LSP. Alternatively, network optimization engine 114 may direct RP module 108 to advertise a new routing policy in BGP UPDATE 126, which may include a new route that increases attracts or diverts additional traffic to/from the head-end router for the LSP identified in notification message 128. BGP UPDATE 126 may represent an example instance of configuration message 10B of FIG. 1.

Figure 4:
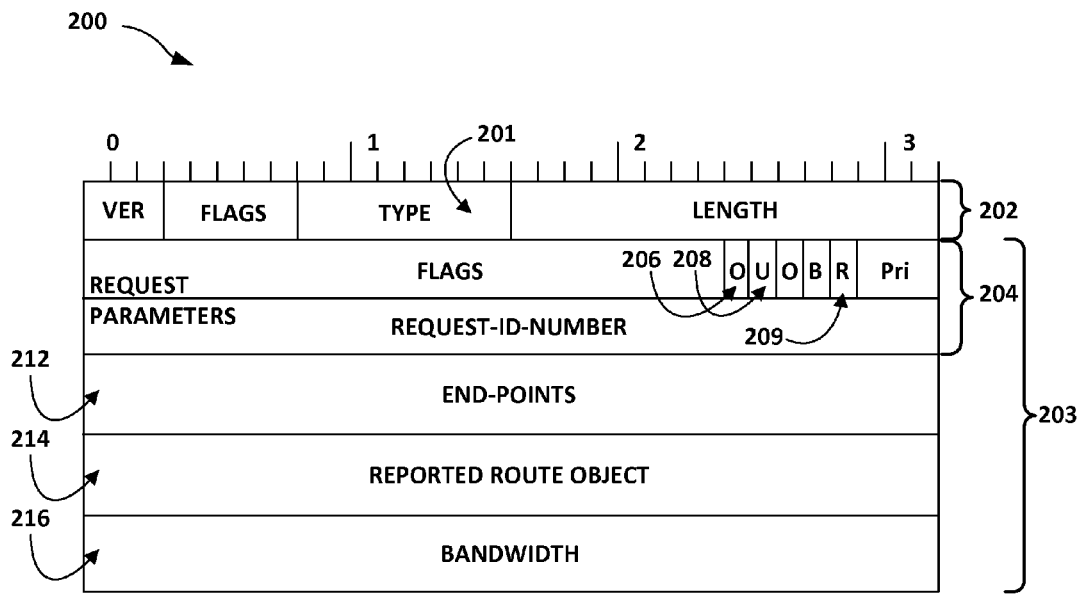
FIG. 4 is a block diagram illustrating an example Path Computation Element Protocol (PCEP) message that has been extended to include bandwidth usage information according to techniques described in this disclosure.

FIG. 4 is a block diagram illustrating an example Path Computation Element Protocol (PCEP) message that has been extended to include bandwidth usage information according to techniques described in this disclosure. In this example, Path Computation Request (PCReq) message 200 is a PCReq message sent by a path computation client to a path computation element to request a path computation. PCReq message 200 includes only one path computation request 203, but other examples of PCReq message 200 may include multiple path computation requests. PCReq message 200 may represent an example instance of notification message 10A of FIG. 1, notification message 70 of FIG. 2, or notification message 130 of FIG. 3, for instance. PCReq message 200 is only one example of a message for implementing techniques described in this disclosure. Other variations are contemplated.

PCReq message 200 include the PCEP common header 202, with the Message-Type field set to 3 in accordance with RFC 5440 to indicate a PCReq message. PCReq message 200 further includes Request Parameters (RP) object 204 that specifies various characteristics of the path computation request. RP object 204 includes numerous flags that are followed by a Request-ID-Number which, when combined with a source address of the PCC and PCE address, uniquely identifies the path computation request context.

End-points object 212 of PCReq message 200 specifies the source IP address and the destination IP address of the path for which a path computation is requested. PCReq message 200 also includes a Reported Route Object (RRO) 214 that reports the route followed by a TE LSP for which a PCC is requesting a reoptimization with PCReq message 200, as well as a Bandwidth object 216 that denotes the bandwidth currently allocated by the PCC device to the TE LSP. In this way, a PCC may provide bandwidth usage information to a stateless PCE for an existing TE LSP so as to trigger ameliorative measures to increase the bandwidth allocated to the TE LSP or otherwise reconfigure the PCC device with new routing policies or to modify the traffic patterns mapped to the TE LSP.

To indicate that PCReq message 200 relates to the reoptimization of an existing TE LSP, the R bit 209 of PCReq message 200 may be set and the RRO 214 included. In accordance with the techniques of this disclosure, PCReq message 200 is extended to include an Overflow bit (or "flag") 206 and an Underflow flag 208. Overflow flag 206, when set, indicates that the TE LSP referred to in request 203 has exceeded an overflow threshold configured in the PCC device (e.g., a head-end router or other network device for the TE LSP). Similarly, a set underflow flag 208 indicates that the TE LSP referred to in request 203 has exceeded an underflow threshold configured in the PCC device. Other examples of PCReq message 200 may include only one of the Overflow flag 206 or Underflow flag 208. In this way, PCReq message 200 may be used by a PCC to provide bandwidth usage information for an existing TE LSP to a path computation element.

Figure 5:
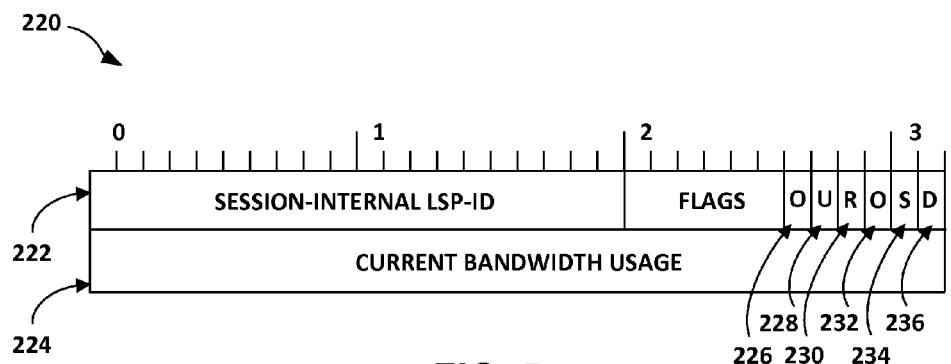
FIG. 5 is a block diagram illustrating a portion of an example Path Computation Element Protocol (PCEP) message that has been extended to include bandwidth usage information according to techniques described in this disclosure.

FIG. 5 is a block diagram illustrating a portion of an example Path Computation Element Protocol (PCEP) message that has been extended to include bandwidth usage information according to techniques described in this disclosure. A Path Computation Report message (PCRpt) may be extended according to the techniques of this disclosure and used by a PCC to provide bandwidth usage information for a TE LSP to a stateful PCE. PCRpt messages are described in U.S. patent application Ser. No. 13/324,861, incorporated above.

LSP object 220 is carried by a PCRpt message and includes SESSION-INTERNAL LSP-ID field 222 that specifies an LSP identifier (LSP-ID) of the target LSP for the state report that includes LSP object 220. SESSION-INTERNAL LSP-ID field 222 may be a per-PCEP session identifier for the target LSP. That is, for each of its extended PCEP sessions, a PCC creates a unique LSP-ID for each LSP that it owns and maps the LSP-ID to the symbolic name for the corresponding, target LSP. The PCC communicates the mapping in PCRpt messages to PCEs. Subsequent extended PCRpt may then address the target LSP by its LSP-ID, which is specified by SESSION-INTERNAL LSP-ID field 222 of LSP object 220.

In accordance with the techniques of this disclosure, LSP object 220 is extended to include an Overflow flag 226 and an Underflow flag 228. Overflow flag 226, when set, indicates that the TE LSP identified in SESSION-INTERNAL LSP-ID field 222 has exceeded an overflow threshold configured in the PCC device (e.g., a head-end router or other network device for the TE LSP). Similarly, a set underflow flag 228 indicates that the TE LSP identified in SESSION-INTERNAL LSP-ID field 222 has exceeded an underflow threshold configured in the PCC device. Other examples of LSP object 220 may include only one of the Overflow flag 226 or Underflow flag 228. LSP object 220 also includes current bandwidth usage field 224 that, e.g., specifies current bandwidth usage of traffic mapped to the TE LSP identified in SESSION-INTERNAL LSP-ID field 222 over the previous measured interval. Current bandwidth usage field 224 may as a result provide more precise bandwidth usage to the PCE in the case of overflow or underflow. In this way, an LSP object 220 of a PCRpt message may be used by a PCC to provide bandwidth usage information for an existing TE LSP to a path computation element.

Figure 6:
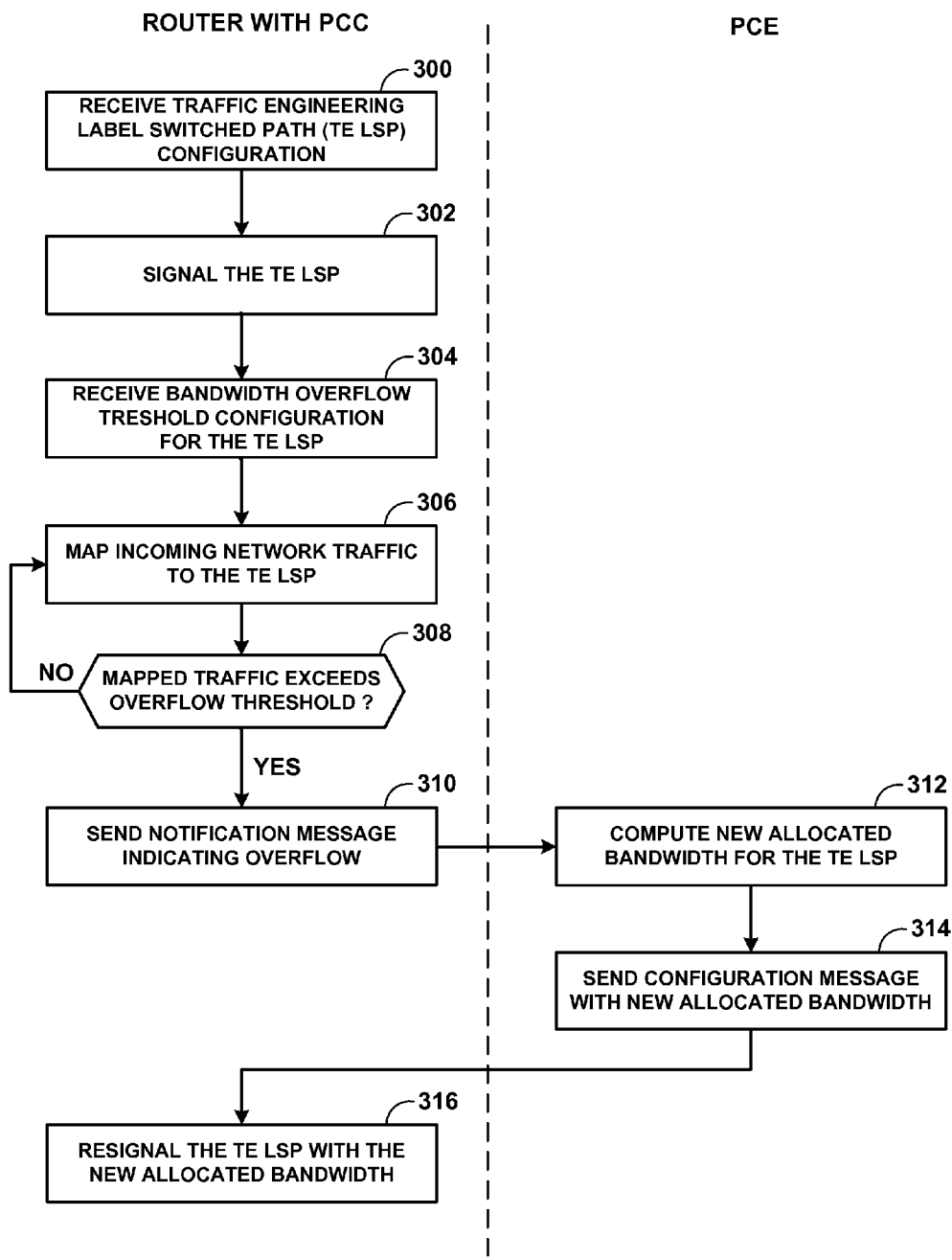
FIG. 6 is a flowchart illustrating example modes of operation for a path computation client to trigger resizing of a traffic engineering label switched path by a path computation client in accordance with techniques described herein.

FIG. 6 is a flowchart illustrating example modes of operation for a path computation client to trigger resizing of a traffic engineering label switched path by a path computation client. The example modes are described with respect to router 4A executing path computation client (PCC) 8A and path computation element (PCE) 6 of FIG. 1.

Router 4A receives configuration information for a TE LSP 14A (300), in some cases from PCE 6, and uses an LSP signaling protocol such as RSVP-TE to signal and thereby establish the TE LSP 14A (302). Router 4A additionally receives configuration information specifying a bandwidth overflow threshold for the TE LSP 14A (304). While the TE LSP 14A is operative to transport labeled network traffic, router 4A maps incoming traffic to the TE LSP 14A and monitors the bandwidth of the mapped network traffic (306). If the bandwidth of the mapped traffic exceeds the configured bandwidth overflow threshold for the TE LSP 14A (YES branch of 308), PCC 8A of router 4A sends notification message 10A indicating the overflow for the TE LSP 14A to PCE 6 (310).

PCE 6 receives notification message 10A and, in this example, computes a new, higher allocated bandwidth for the TE LSP 14A (312) and returns, to PCC 8A, a configuration message 10B that includes the new allocated bandwidth (314). PCC 8A receives the configuration message 10B and, in response, router 4A resignals the TE LSP 14A according to the new allocated bandwidth (316).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
   signaling, by a network router, a label switched path (LSP) in a packet-switched network according to an allocated bandwidth for the LSP, wherein the network router is a head-end label edge router for the LSP;
   determining, by the network router, bandwidth usage information for the LSP that indicates a volume of network packets mapped to the LSP by the network router for transport along the LSP;
   sending, by the network router in a notification message, the bandwidth usage information for the LSP to a path computation element that computes label switched paths for a path computation domain that includes the network router to trigger reoptimization of the path computation domain by the path computation element;
   receiving, by the network router from the path computation element and in response to sending the notification message, a configuration message that includes one of a route according to a layer 3 routing protocol and a filter that defines criteria for mapping subsequent network packets to the LSP; and
   by the network router in response to receiving the configuration message, one of (1) installing the route to a routing information base associated with the layer 3 routing protocol and advertising, to one or more other network devices, the route in a routing protocol message according to the layer 3 routing protocol to cause the one or more other network devices to divert subsequent network packets that match the route from the network router to reduce an amount of subsequent network packets received by the network router and mapped to the LSP and (2) installing the filter to forwarding information to modify the criteria for mapping the subsequent network packets to the LSP.

2. The method of claim 1, further comprising:
   determining, by the network router, whether a bandwidth usage of the LSP by the network packets exceeds a bandwidth threshold associated with the LSP,
   only upon determining the bandwidth usage of the LSP by the network packets exceeds the bandwidth threshold, sending the bandwidth usage information to the path computation element.

3. The method of claim 2, wherein the bandwidth usage information comprises an indication that the bandwidth usage of the LSP by the network packets has exceeded the bandwidth threshold.

4. The method of claim 2,
   wherein the bandwidth threshold comprises a percentage of the allocated bandwidth for the LSP, and
   wherein determining whether the bandwidth usage by the network packets exceeds the bandwidth threshold comprises determining whether the bandwidth usage of the LSP by the network packets exceeds the percentage of the allocated bandwidth for the LSP above or below the allocated bandwidth.

5. The method of claim 1,
   wherein the configuration information further includes a new allocated bandwidth for the LSP, and
   wherein reconfiguring the network router further comprises resignaling the LSP according to the new allocated bandwidth for the LSP.

6. The method of claim 1, further comprising:
   establishing, by the network router, an extended Path Computation Element Protocol (PCEP) session with the path computation element,
   wherein sending, by the network router in the notification message, the bandwidth usage information for the LSP to the path computation element comprises sending the notification message by the PCEP session.

7. The method of claim 6, wherein the notification message comprises one of a PCEP path computation request (PCReq) or a path computation report (PCRpt) extended to include a flag that indicates a bandwidth usage of the LSP by the network packets has exceeded a bandwidth threshold associated with the LSP in the network router.

8. A method comprising:
   receiving, from a network router by a path computation element that computes label switched paths for a path computation domain that includes the network router, a notification message that includes bandwidth usage information for a label switched path (LSP) in a packet-switched network and operating according to an allocated bandwidth for the LSP, wherein the bandwidth usage information indicates a volume of traffic mapped to the LSP by the network router; and
   in response to receiving the notification message and by the path computation element, sending a configuration message to the network router,
   the configuration message including one of a route according to a layer 3 routing protocol and a filter that defines criteria for mapping subsequent network packets to the LSP,
   the configuration message directing the network router to one of (1) installing the route to a routing information base associated with the routing protocol and advertising, to one or more other network devices, the route in a routing protocol message according to the layer 3 routing protocol to cause the one or more other network devices to divert subsequent network packets that match the route from the network router to reduce an amount of subsequent network packets received by the network router and mapped to the LSP and (2) installing the filter to forwarding information to modify the criteria for mapping the subsequent network packets to the LSP, wherein the route, when advertised by the network router according to the layer 3 routing protocol.

9. The method of claim 8,
wherein sending a configuration message to the path computation domain comprising sending a configuration message to the network router, and
wherein the configuration message further includes a new allocated bandwidth for the LSP.

10. A network router comprising:
a control unit comprising a processor;
a routing protocol module executed by the control unit and configured to signal a label switched path (LSP) in a packet-switched network according to an allocated bandwidth for the LSP, wherein the network router is a head-end label edge router for the LSP;
one or more network interfaces configured to receive network packets;
one or more forwarding components configured to determine bandwidth usage information for the LSP that indicates a volume of the network packets mapped to the LSP by the network router for transport along the LSP; and
a path computation element interface configured to send, in a notification message, the bandwidth usage information for the LSP to a path computation element that computes label switched paths for a path computation domain that includes the network router to trigger reoptimization of the path computation domain by the path computation element,
wherein the path computation element interface is further configured to receive, from the path computation element and in response to sending the notification message, a configuration message that includes one of a route according to a layer 3 routing protocol and a filter that defines criteria for mapping subsequent network packets to the LSP, and
wherein the routing protocol module is further configured to reconfigure, in response to receiving the configuration message, the network router by one of (1) installing the route to a routing information base associated with the layer 3 routing protocol and advertising, to one or more other network devices, the route in a routing protocol message according to the layer 3 routing protocol to cause the one or more other network devices to divert subsequent network packets that match the route from the network router to reduce an amount of subsequent network packets received by the network router and manned to the LSP and (2) installing the filter to forwarding information to modify the criteria for mapping the subsequent network packets to the LSP.

11. The network router of claim 10,
wherein the forwarding components are configured to determine whether a bandwidth usage of the LSP by the network packets exceeds a bandwidth threshold associated with the LSP, and wherein the path computation element interface is configured to, only upon determining the bandwidth usage of the LSP by the network packets exceeds the bandwidth threshold, send the bandwidth usage information to the path computation element.

12. The network router of claim 11, wherein the bandwidth usage information comprises an indication that the bandwidth usage of the LSP by the network packets has exceeded the bandwidth threshold.

13. The network router of claim 11,
wherein the bandwidth threshold comprises a percentage of the allocated bandwidth for the LSP, and
wherein the forwarding components are configured to determine whether the bandwidth usage by the network packets exceeds the bandwidth threshold by determining whether the bandwidth usage of the LSP by the network packets exceeds the percentage of the allocated bandwidth for the LSP above or below the allocated bandwidth.

14. The network router of claim 10, wherein the configuration information further includes a new allocated bandwidth for the LSP, and wherein the routing protocol module is further configured to reconfigure the network router by resignaling the LSP according to the new allocated bandwidth for the LSP.

15. The network router of claim 10, further comprising:
a path computation client executed by the control unit and configured to establish an extended Path Computation Element Protocol (PCEP) session with the path computation element,
wherein path computation element interface is configured to send, in the notification message, the bandwidth usage information for the LSP to the path computation element by sending the notification message by the PCEP session.

16. The network router of claim 15, wherein the notification message comprises one of a PCEP path computation request (PCReq) or a path computation report (PCRpt) extended to include a flag that indicates a bandwidth usage of the LSP by the network packets has exceeded a bandwidth threshold associated with the LSP in the network router.

17. A path computation element that computes label switched paths for a path computation domain, the path computation element comprising:
a control unit comprising a processor;
a path computation client interface executed by the control unit and configured to receive, from a network router of the path computation domain, a notification message that includes bandwidth usage information for a label switched path (LSP) in a packet-switched network and operating according to an allocated bandwidth for the LSP, wherein the bandwidth usage information indicates a volume of traffic mapped to the LSP by the network router;
a network optimization engine configured to determine, in response to the notification message, a modification to the path computation domain,
wherein the path computation client interface is configured to send a configuration message to the network router, the configuration message including one of a route according to a layer 3 routing protocol and a filter that defines criteria for mapping subsequent network packets to the LSP,
the configuration message directing the network router to implement the modification to the path computation domain one of (1) installing the route to a routing information base associated with the routing protocol and advertising, to one or more other network devices, the route in a routing protocol message according to the layer 3 routing protocol to cause the one or more other network devices to divert subsequent network packets that match the route from the network router to reduce an amount of subsequent network packets received by the network router and mapped to the LSP and (2) installing the filter to forwarding information to modify the criteria for mapping the subsequent network packets to the LSP.

18. The path computation element of claim 17,
wherein the path computation client interface is configured to send a configuration message to the path computation domain by sending a configuration message to the network router, and
wherein the configuration message further includes a new allocated bandwidth for the LSP.

\* \* \* \* \*